United States Patent
Khlat et al.

(10) Patent No.: US 10,277,260 B2
(45) Date of Patent: Apr. 30, 2019

(54) MULTI RADIO ACCESS TECHNOLOGY RADIO CIRCUIT

(71) Applicant: Qorvo US, Inc., Greensboro, NC (US)

(72) Inventors: Nadim Khlat, Cugnaux (FR); Andrew F. Folkmann, Cedar Rapids, IA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/889,616

(22) Filed: Feb. 6, 2018

(65) Prior Publication Data
US 2019/0081649 A1 Mar. 14, 2019

Related U.S. Application Data

(60) Provisional application No. 62/557,234, filed on Sep. 12, 2017.

(51) Int. Cl.
  *H04B 1/04* (2006.01)
  *H04B 1/10* (2006.01)
  *H04W 88/06* (2009.01)
  *H04B 1/40* (2015.01)

(52) U.S. Cl.
  CPC ......... *H04B 1/0475* (2013.01); *H04B 1/1027* (2013.01); *H04B 1/40* (2013.01); *H04W 88/06* (2013.01)

(58) Field of Classification Search
  None
  See application file for complete search history.

(56) References Cited

PUBLICATIONS

Kaczman et al., A Single-Chip 10-Band WCDMA/HSDPA 4-Band GSM/EDGE SAW-less CMOS Receiver With DigRF 3G Interface and �� 90 dBm IIP2, IEEE Journal of Solid-State Circuits, vol. 44, No. 3, Mar. 2009 (Year: 2009).*
Avanti, Satellite Role in 5G Eco-System & Spectrum Identification for 5G, Some Perspectives, IET 5G Workshop. London, Mar. 17, 2015 (Year: 3015).*
Kaczman etal., A Single-Chip 10-Band WCDMA/HSDPA 4-Band GSM/EDGE SAW-less CMOS Receiver With DigRF 3G Interface and 90 dBm IIP2, IEEE Journal of Solid-State Circuits, vol. 44, No. 3, Mar. 2009 (Year: 2009).*
Avanti, Satellite Role in 5G Eco-System & Spectrum Identification for 5G, Some Perspectives, IET 5G Workshop. London, Mar. 17, 2015 (Year: 2015).*

* cited by examiner

*Primary Examiner* — Mohammed Rachedine
(74) *Attorney, Agent, or Firm* — Withrow & Terranova, P.L.L.C.

(57) ABSTRACT

A multi radio access technology (RAT) radio circuit is provided. The multi RAT radio circuit can support concurrent transmission of radio frequency (RF) transmit signals modulated based on a first RAT and a second RAT and concurrent reception of RF receive signals modulated based on the first RAT and the second RAT. The multi RAT radio circuit splits each RF transmit signal into an in-phase transmit signal and a quadrature transmit signal. The determined phase offset is so configured such that the multi RAT radio circuit can effectively suppress an IMD(s) located above and below a transmit band(s) of the RF transmit signals. By suppressing the IMD(s), it is possible to improve RF performance of the multi RAT radio circuit regardless of whether the RF transmit signals and the RF receive signals are communicated in a contiguous or non-contiguous RF spectrum.

21 Claims, 5 Drawing Sheets

MULTI RADIO ACCESS TECHNOLOGY RADIO CIRCUIT

RELATED APPLICATIONS

This application claims the benefit of U.S. Provisional Patent Application Ser. No. 62/557,234, filed on Sep. 12, 2017, which is incorporated herein by reference in its entirety.

FIELD OF THE DISCLOSURE

The technology of the disclosure relates generally to transmitting and receiving radio frequency (RF) signals in wireless communication devices.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by such advanced radio access technology (RAT) as long-term evolution (LTE) and fifth-generation new radio (5G-NR). To achieve the higher data rates, a mobile communication device often employs a power amplifier(s) to increase output power of radio frequency (RF) signals (e.g., maintaining sufficient energy per bit) communicated by mobile communication devices. In addition, the mobile communication device may employ a filter(s) and/or a coupler(s) in various processing stages along a signal transmission path(s) and a signal reception path(s).

The mobile communication device may be configured to transmit an uplink RF signal(s) concurrently in an LTE transmit band and a 5G-NR transmit band (e.g., LTE uplink band 71 and 5G-NR uplink band 71), while concurrently receiving a downlink RF signal(s) in an LTE receive band and a 5G-NR receive band (e.g., LTE downlink band 71 and 5G-NR downlink band 71). Given that the power amplifier(s), the filter(s), and/or the coupler(s) on the signal transmission path can be inherently non-linear, the uplink RF signal(s) can cause an intermodulation distortion(s) (e.g., a third order intermodulation distortion (IMD3)) to be generated above and below RF spectrums of the LTE transmit band and the 5G-NR transmit band. Moreover, the intermodulation distortion(s) may fall within the LTE receive band and/or the 5G-NR receive band, thus desensing a receiver(s) configured to receive the downlink RF signal(s). Although it is possible to employ additional filters to suppress the intermodulation distortion(s) in the mobile communication device, it may be difficult to do so for certain LTE and 5G-NR bands with a non-contiguous RF spectrum(s). Thus, it may be desirable to suppress the intermodulation distortion(s) in the mobile communication device to support concurrent LTE and 5G-NR transmission and reception in both contiguous and non-contiguous RF spectrums.

SUMMARY

Aspects disclosed in the detailed description include a multi radio access technology (RAT) radio circuit. The multi RAT radio circuit can support concurrent transmission of radio frequency (RF) transmit signals modulated based on a first RAT (e.g., long-term evolution) and a second RAT (e.g., fifth-generation new radio) and concurrent reception of RF receive signals modulated based on the first RAT and the second RAT. In examples discussed herein, the multi RAT radio circuit splits each RF transmit signals into an in-phase transmit signal and a quadrature transmit signal, which has a determined phase offset relative to the in-phase transmit. The determined phase offset is so configured such that the multi RAT radio circuit can effectively suppress an IMD(s) located above and below a transmit band(s) of the RF transmit signals. By suppressing the IMD(s), it is possible to improve RF performance of the multi RAT radio circuit regardless of whether the RF transmit signals and the RF receive signals are communicated in a contiguous or non-contiguous RF spectrum.

In one aspect, a multi RAT radio circuit is provided. The multi RAT radio circuit includes a first transmit port and a second transmit port configured to receive a first transmit signal modulated based on a first RAT for transmission in a first transmit band and a second transmit signal modulated based on a second RAT for transmission in a second transmit band, respectively. The multi RAT radio circuit also includes a first receive port and a second receive port each configured to output a first receive signal modulated based on the first RAT and a second receive signal modulated based on the second RAT, respectively. The multi RAT radio circuit also includes first RAT circuitry configured to split the first transmit signal into a first in-phase transmit signal and a first quadrature transmit signal having a first phase offset relative to the first in-phase transmit signal. The multi RAT radio circuit also includes second RAT circuitry configured to split the second transmit signal into a second in-phase transmit signal and a second quadrature transmit signal having a second phase offset relative to the second in-phase transmit signal. The first phase offset and the second phase offset are determined such that the first RAT circuitry and the second RAT circuitry can suppress at least one predetermined IMD at the first receive port and the second receive port based on the first in-phase transmit signal, the first quadrature transmit signal, the second in-phase transmit signal, and the second quadrature transmit signal.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a multi radio access technology (RAT) radio circuit. The multi RAT radio circuit can support concurrent transmission of radio frequency (RF) transmit signals modulated based on a first RAT (e.g., long-term evolution) and a second RAT (e.g., fifth-generation new radio) and concurrent reception of RF receive signals modulated based on the first RAT and the second RAT. In examples discussed herein, the multi RAT radio circuit splits each RF transmit signal into an in-phase transmit signal and a quadrature transmit signal, which has a determined phase offset relative to the in-phase transmit. The determined phase offset is so configured such that the multi RAT radio circuit can effectively suppress an IMD(s) located above and below a transmit band(s) of the RF transmit signals. By suppressing the IMD(s), it is possible to improve RF performance of the multi RAT radio circuit regardless of whether the RF transmit signals and the RF receive signals are communicated in contiguous or non-contiguous RF spectrum.

Before discussing the multi RAT radio circuit of the present disclosure, a brief overview of a pair of third order IMDs (IMD3s) located above and below a pair of RF transmit bands is first provided with reference to FIG. 1 to help understand the relationship between transmission frequencies and IMD3 frequencies. The discussion of specific exemplary aspects of the multi RAT radio circuit according to the present disclosure starts below with reference to FIG. 2.

Figure 1:
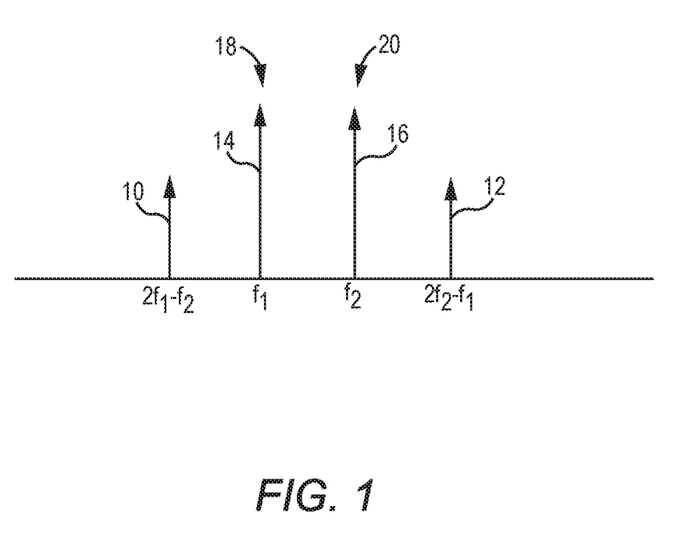
FIG. 1 is a schematic diagram providing an exemplary illustration of a pair of third order intermodulation distortions (IMD3s) located below and above radio frequency (RF) spectrums of a pair of transmit bands carrying a pair of RF transmit signals, respectively.

FIG. 1 is a schematic diagram providing an exemplary illustration of a pair of IMD3s 10, 12 located below and above RF spectrums of a pair of transmit bands 14, 16 carrying a pair of RF transmit signals 18, 20, respectively. In an RF circuit, a number of IMDs may be generated above and below the RF spectrums of the transmit bands 14, 16 as a result of the transmit signals 18, 20 being processed by such non-linear circuitries as power amplifiers, filters, and/or couplers in the RF circuit. Among the IMDs, the IMD3s 10, 12 are of particular concern due to spectral proximity to the transmit bands 14, 16. The transmit bands 14, 16 correspond to RF frequencies $f_1$, $f_2$ ($f_2 > f_1$), respectively. The IMD3 10 corresponds to an IMD frequency $2f_1 - f_2$, which is lower than the RF frequencies $f_1$ and $f_2$. The IMD3 12 corresponds to an IMD frequency $2f_2 - f_1$, which is higher than the RF frequencies $f_1$ and $f_2$. For the convenience of reference, the IMD3 10 and the IMD3 12 are hereinafter referred to as "lower IMD3" and "upper IMD3," respectively.

In a non-limiting example, the transmit bands 14, 16 correspond respectively to LTE uplink band 71 (663-698 MHz) and 5G-NR uplink band 71 (663-698 MHz). If the RF transmit signals 18, 20 are modulated respectively at 663 MHz and 675 MHz, for example, the IMD3s 10, 12 would appear at 651 MHz and 687 MHz, respectively. In this regard, the IMD3 10 would fall into either LTE downlink band 71 (617-652 MHz) or 5G-NR downlink band 71 (617-752), thus desensing RF receivers configured to receive RF signals in the LTE downlink band 71 and/or the 5G-NR downlink band 71. As such, it may be desirable to suppress the IMD3s 10, 12 to improve RF performance of the RF circuit.

Figure 2:
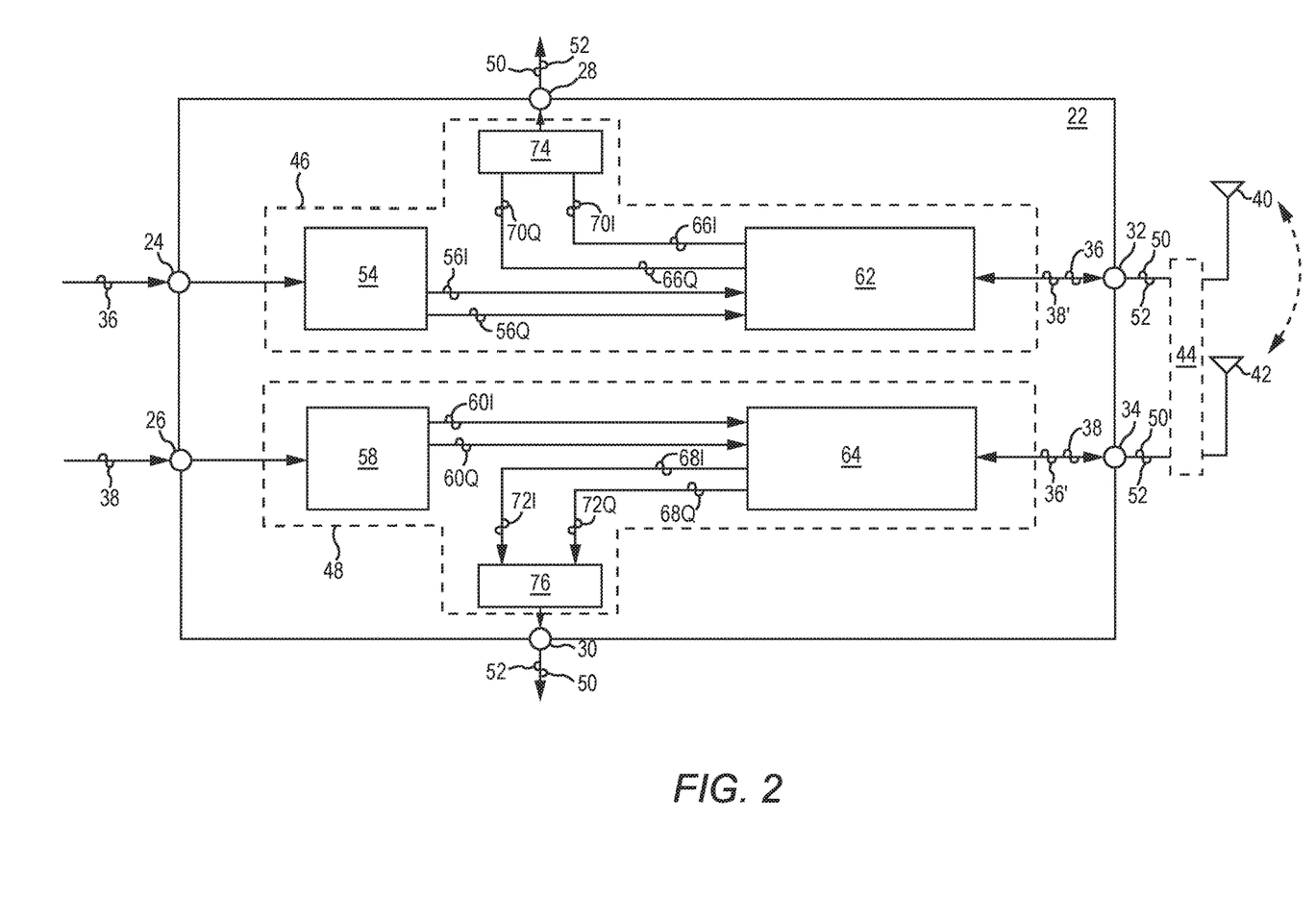
FIG. 2 is a schematic diagram of an exemplary multi radio access technology (RAT) radio circuit configured to suppress a predetermined intermodulation distortion (IMD) while supporting concurrent transmission and reception of RF signals modulated based on a number of different RATs.

In this regard, FIG. 2 is a schematic diagram of an exemplary multi RAT radio circuit 22 configured to suppress a predetermined IMD while supporting concurrent transmission and reception of RF signals modulated based on a number of different RATs. As discussed below in detail, the multi RAT radio circuit 22 splits each RF transmit signal into an in-phase transmit signal and a quadrature transmit signal, which has a determined phase offset relative to the in-phase transmit. The determined phase offset is so configured such that the multi RAT radio circuit 22 can effectively suppress an IMD(s) located above and below a transmit band(s) of the RF transmit signals. By suppressing the IMD(s), it is possible to improve RF performance of the multi RAT radio circuit 22 regardless of whether the RF transmit signals and the RF receive signals are communicated in a contiguous or non-contiguous RF spectrum.

The multi RAT radio circuit 22 includes a first transmit port 24, a second transmit port 26, a first receive port 28, a second receive port 30, a first antenna port 32, and a second antenna port 34. The first transmit port 24 is configured to receive a first transmit signal 36, which is modulated based on a first RAT, for transmission in a first transmit band. The second transmit port 24 is configured to receive a second transmit signal 38, which is modulated based on a second RAT, for transmission in a second transmit band.

The first antenna port 32 and the second antenna port 34 may be coupled to a first antenna 40 and a second antenna 42. The first antenna 40 may be a primary antenna and the second antenna 42 may be a diversity antenna. In one non-limiting example, the first antenna port 32 and the second antenna port 34 can be coupled to the first antenna 40 and the second antenna 42, respectively. In another non-limiting example, the first antenna port 32 and the second antenna port 34 may be coupled to the first antenna 40 and the second antenna 42 via antenna swapping circuitry 44. In this regard, it is also possible to couple the first antenna port 32 to the second antenna 42 and couple the second antenna port 34 to the first antenna 40.

The multi RAT radio circuit 22 includes first RAT circuitry 46 and second RAT circuitry 48. The first RAT circuitry 46 is provided between the first transmit port 24 and the first antenna port 32. The first RAT circuitry 46 is configured to amplify the first transmit signal 36 and provide the amplified first transmit signal 36 to the first antenna port 32 for transmission in the first transmit band. The second RAT circuitry 48 is provided between the second transmit port 26 and the second antenna port 34. The second RAT circuitry 48 is configured to amplify the second transmit signal 38 and provide the amplified second transmit signal 38 to the second antenna port 34 for transmission in the second transmit band.

Each of the first antenna port 32 and the second antenna port 34 may concurrently receive a first receive signal 50, which is modulated based on the first RAT, in a first receive band and a second receive signal 52, which is modulated based on the second RAT, in a second receive band. In this regard, the first RAT circuitry 46 is further configured to provide the first receive signal 50 and the second receive signal 52 to the first receive port 28. Likewise, the second RAT circuitry 48 is further configured to provide the first receive signal 50 and the second receive signal 52 to the second receive port 30. The first receive port 28 and the second receive port 30 may be coupled to respective receivers configured to receive and process the first receive signal 50 and the second receive signal 52.

Notably, the first RAT circuitry 46 and the second RAT circuitry 48 may each include a number of nonlinear circuitries and/or components (e.g., power amplifier, filter, coupler, etc.). As a result, the first RAT circuitry 46 and the second RAT circuitry 48 may create an IMD(s) when amplifying the first transmit signal 36 and the second transmit signal 38. According to the previous discussion in FIG. 1, the IMD(s) created by the first RAT circuitry 46 and the second RAT circuitry 48 may fall into the first receive band of the first receive signal 50 and/or the second receive band of the second receive signal 52. As such, the IMD(s) may be outputted from the first receive port 28 and the second receive port 30, thus desensing the receivers coupled to the first receive port 28 and the second receive port 30. Hence, it is desirable to suppress the IMD(s) at the first receive port 28 and the second receive port 30 to help protect the receivers coupled to the first receive port 28 and the second receive port 30.

To help suppress the IMD(s) at the first receive port 28 and the second receive port 30, the first RAT circuitry 46 can include a first transmit hybrid splitter 54 to split the first transmit signal 36 into a first in-phase transmit signal 56I and a first quadrature transmit signal 56Q. The first quadrature transmit signal 56Q has a first phase offset, which may be positive ninety degrees or negative ninety degrees (±90°), relative to the first in-phase transmit signal 56I. The second RAT circuitry 48 can include a second transmit hybrid splitter 58 to split the second transmit signal 38 into a second in-phase transmit signal 60I and a second quadrature transmit signal 60Q. The second quadrature transmit signal 60Q has a second phase offset, which may also be ±90°, relative to the second in-phase transmit signal 60I.

The first RAT circuitry 46 includes a first hybrid splitter/combiner 62 configured to combine the first in-phase transmit signal 56I and the first quadrature transmit signal 56Q into the first transmit signal 36 and provide the first transmit signal 36 to the first antenna port 32. Likewise, the second RAT circuitry 48 includes a second hybrid splitter/combiner 64 configured to combine the second in-phase transmit signal 60I and the second quadrature transmit signal 60Q into the second transmit signal 38 and provide the second transmit signal 38 to the second antenna port 34. Subsequently, the first transmit signal 36 and the second transmit signal 38 are transmitted concurrently via the first antenna 40 and the second antenna 42, or vice versa.

Notably, when the second transmit signal 38 is outputted from the second antenna port 34 for transmission via the second antenna 42, for example, a reflection of the second transmit signal 38 (denoted as 38' in FIG. 2) may be coupled to the first antenna port 32 despite isolations between the first antenna 40 and the second antenna 42. The reflection 38' may have a different phase and/or amplitude from the second transmit signal 38. The first hybrid splitter/combiner 62 is further configured to split the reflection 38' to generate a first in-phase reflection signal 66I and a first quadrature reflection signal 66Q.

Likewise, when the first transmit signal 36 is outputted from the first antenna port 32 for transmission via the first antenna 40, for example, a reflection of the first transmit signal 36 (denoted as 36' in FIG. 2) may be coupled to the second antenna port 34. The reflection 36' may have different phase and/or amplitude from the first transmit signal 36. The second hybrid splitter/combiner 64 is further configured to split the reflection 36' to generate a second in-phase reflection signal 68I and a second quadrature reflection signal 68Q.

The first hybrid splitter/combiner 62 is further configured to convert the first receive signal 50 and the second receive signal 52, which are received concurrently via the first antenna port 32, into a first in-phase receive signal 70I and a first quadrature receive signal 70Q. Each of the first in-phase receive signal 70I and the first quadrature receive signal 70Q is a composite signal including the first receive signal 50 and the second receive signal 52.

Likewise, the second hybrid splitter/combiner 64 is further configured to convert the first receive signal 50 and the second receive signal 52, which are received concurrently via the second antenna port 34, into a second in-phase receive signal 72I and a second quadrature receive signal 72Q. Each of the second in-phase receive signal 72I and the second quadrature receive signal 72Q is a composite signal including the first receive signal 50 and the second receive signal 52.

The IMD(s) resulting from the first in-phase transmit signal 56I, the first quadrature transmit signal 56Q, the first in-phase reflection signal 66I, and the first quadrature reflection signal 66Q are associated with the first in-phase receive signal 70I and the first quadrature receive signal 70Q. Likewise, the IMD(s) resulting from the second in-phase transmit signal 60I, the second quadrature transmit signal 60Q, the second in-phase reflection signal 68I, and the second quadrature reflection signal 68Q are associated with the second in-phase receive signal 72I and the second quadrature receive signal 72Q.

The first RAT circuitry 46 further includes a first receive hybrid combiner 74. The first receive hybrid combiner 74 is configured to convert the first in-phase receive signal 70I and the first quadrature receive signal 70Q back to the first receive signal 50 and the second receive signal 52, while suppressing the IMD(s) associated with the first in-phase receive signal 70I and the first quadrature receive signal 70Q. As such, the first receive port 28 can output the first receive signal 50 and the second receive signal 52 without the IMD(s), thus protecting the receiver coupled to the first receive port 28 from being desensed.

The second RAT circuitry 48 further includes a second receive hybrid combiner 76. The second receive hybrid combiner 76 is configured to convert the second in-phase receive signal 72I and the second quadrature receive signal 72Q back to the first receive signal 50 and the second receive signal 52, while suppressing the IMD(s) associated with the second in-phase receive signal 72I and the second quadrature receive signal 72Q. As such, the second receive port 30 can output the first receive signal 50 and the second receive signal 52 without the IMD(s), thus protecting the receiver coupled to the second receive port 30 from being desensed.

The IMD(s) resulting from the first in-phase transmit signal 56I, the first quadrature transmit signal 56Q, and the reflection 38' may also appear at the first antenna port 32. Likewise, the IMD(s) resulting from the second in-phase transmit signal 60I, the second quadrature transmit signal 60Q, and the reflection 36' may also appear at the second antenna port 34. In this regard, it may also be necessary to suppress the IMD(s) presenting at the first antenna port 32 to prevent the IMD(s) from being recoupled to the second antenna port 34. Similarly, it may also be necessary to suppress the IMD(s) presenting at the second antenna port 34 to prevent the IMD(s) from being recoupled to the first antenna port 32.

The multi RAT radio circuit 22 can be configured to suppress a lower IMD3 located at a frequency $2f_1-f_2$, which is lower than a first frequency $f_1$ of the first transmit band and a second frequency $f_2$ of the second transmit band. The multi RAT radio circuit 22 can also be configured to suppress an upper IMD3 located at frequency $2f_2-f_1$, which is higher than the first frequency $f_1$ of the first transmit band and the second frequency $f_2$ of the second transmit band.

Figure 3A:
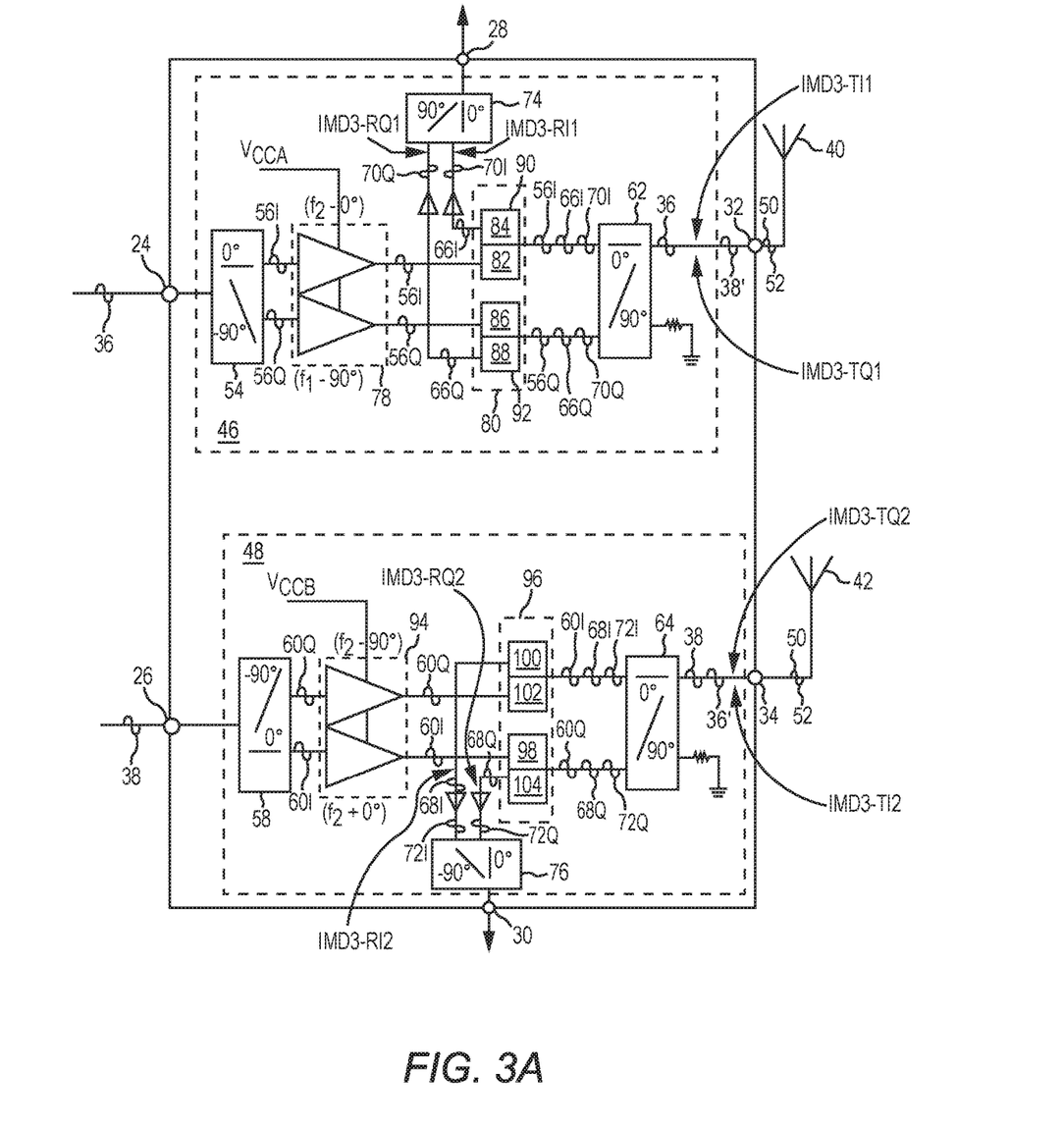
FIG. 3A is a schematic diagram providing an exemplary illustration of the multi RAT radio circuit of FIG. 2 configured to suppress a lower IMD3 according to one embodiment of the present disclosure.

In this regard, FIG. 3A is a schematic diagram providing an exemplary illustration of the multi RAT radio circuit 22 of FIG. 2 configured to suppress a lower IMD3 located at a frequency $2f_1-f_2$, which is lower than a first frequency $f_1$ of the first transmit band and a second frequency $f_2$ of the second transmit band. Common elements between FIGS. 2 and 3A are shown therein with common element numbers and will not be re-described herein.

The first transmit hybrid splitter 54 is configured to generate the first in-phase transmit signal 56I at the first frequency $f_1$ and in a 0° phase. Accordingly, the first in-phase transmit signal 56I can be expressed as $f_1+0°$. The first transmit hybrid splitter 54 is configured to generate the first quadrature transmit signal 56Q at the first frequency $f_1$ and in a −90° phase (the first phase offset). Accordingly, the first quadrature transmit signal 56Q can be expressed as $f_1-90°$. The first RAT circuitry 46 includes a first quadrature amplifier circuit 78. The first quadrature amplifier circuit 78 is configured to amplify the first in-phase transmit signal 56I and the first quadrature transmit signal 56Q based on a first supply voltage $V_{CCA}$. In a non-limiting example, the first supply voltage $V_{CCA}$ can be envelope tracking (ET) modulated or average power tracking (APT) modulated.

The first hybrid splitter/combiner 62 is configured to generate the first in-phase reflection signal 66I at the second frequency $f_2$ and in a 0° phase. Accordingly, the first in-phase reflection signal 66I can be expressed as $f_2+0°$. The first hybrid splitter/combiner 62 is configured to generate the first quadrature reflection signal 66Q at the second frequency $f_2$ and in a +90° phase. Accordingly, the first quadrature reflection signal 66Q can be expressed as $f_2+90°$.

The first RAT circuitry 46 includes first filter circuitry 80, which is provided between the first quadrature amplifier circuit 78 and the first hybrid splitter/combiner 62. In one non-limiting example, the first filter circuitry 80 can be integrated with the first hybrid splitter/combiner 62 in an acoustic die. In another non-limiting example, the first filter circuitry 80, the first hybrid splitter/combiner 62, and the first receive hybrid combiner 74 can be integrated into an acoustic die. The first filter circuitry 80 includes a first in-phase transmit filter 82 configured to pass through the first in-phase transmit signal 56I. The first filter circuitry 80 also includes a first in-phase receive filter 84 configured to pass through the first in-phase reflection signal 66I and the first in-phase receive signal 70I. The first filter circuitry 80 also includes a first quadrature transmit filter 86 configured to pass through the first quadrature transmit signal 56Q. The first filter circuitry 80 also includes a first quadrature receive filter 88 configured to pass through the first quadrature reflection signal 66Q and the first quadrature receive signal 70Q. In a non-limiting example, the first in-phase transmit filter 82, the first in-phase receive filter 84, the first quadrature transmit filter 86, and the first quadrature receive filter 88 can be implemented as surface acoustic wave (SAW) filters or any type of acoustic filters. The first in-phase transmit filter 82 and the first in-phase receive filter 84 form a first in-phase duplexer 90. The first quadrature transmit filter 86 and the first quadrature receive filter 88 form a first quadrature duplexer 92.

The first in-phase receive signal 70I is provided to the first receive hybrid combiner 74 from the first in-phase receive filter 84 in the first in-phase duplexer 90. The first in-phase transmit signal 56I and the first in-phase reflection signal 66I, which also pass through the first in-phase duplexer 90, thus create a first receive in-phase IMD3 (denoted as IMD3-RI1 in FIG. 3A) in the first in-phase receive signal 70I. The first receive in-phase IMD3 can thus be expressed as $2*(f_1+0°)-(f_2+0°)=2f_1-f_2+0°-0°$. In this regard, the first receive in-phase IMD3 is located at a frequency $2f_1-f_2$ and in a 0° phase.

The first quadrature receive signal 70Q is provided to the first receive hybrid combiner 74 from the first quadrature receive filter 88 in the first quadrature duplexer 92. The first quadrature transmit signal 56Q and the first quadrature reflection signal 66Q, which also pass through the first quadrature duplexer 92, thus create a first receive quadrature IMD3 (denoted as IMD3-RQ1 in FIG. 3A) in the first quadrature receive signal 70Q. The first receive quadrature IMD3 can thus be expressed as $2*(f_1-90°)-(f_2+90°)=2f_1-f_2-270°$. In this regard, the first receive quadrature IMD3 is located at frequency $2f_1-f_2$ and in a −270° phase.

The first receive hybrid combiner 74 is configured to phase shift the first quadrature receive signal 70Q by +90° prior to combining the first quadrature receive signal 70Q with the first in-phase receive signal 70I. As such, the first receive quadrature IMD3 becomes $2f_1-f_2-270°+90°=2f_1-f_2-180°$. The −180° phase offset causes the first receive in-phase IMD and the first receive quadrature IMD to cancel each other at the first receive port 28.

Given that both the first in-phase transmit signal 56I and the first in-phase reflection signal 66I pass through the first in-phase duplexer 90, a first transmit in-phase IMD3 (denoted as IMD3-TI1 in FIG. 3A) may result at the first antenna port 32. The first transmit in-phase IMD3 can be expressed as $2*(f_1+0°)-(f_2+0°)=2f_1-f_2+0°-0°$. In this regard, the first transit in-phase IMD3 is located at a frequency $2f_1-f_2$ and in a 0° phase.

Further, because the first quadrature transmit signal 56Q and the first quadrature reflection signal 66Q both pass through the first quadrature duplexer 92, a first transmit quadrature IMD3 (denoted as IMD3-TQ1 in FIG. 3A) may also result at the first antenna port 32. The first transmit quadrature IMD3 can be expressed as $2*(f_1-90°)-(f_2+90°)+90°=2f_1-f_2-180°-90°+90°=2f_1-f_2-180°$. In this regard, the first transmit quadrature IMD3 is located at frequency $2f_1-f_2$ and in a −180° phase. As a result of the −180° phase offset between the first transmit in-phase IMD and the first transmit quadrature IMD, the first transmit in-phase IMD and the first transmit quadrature IMD cancel each other at the first antenna port 32.

In a non-limiting example, the first RAT circuitry 46 configured as above can suppress the lower IMD3 to below −98 dBm at the first receive port 28. Further, in addition to suppressing the lower IMD3 at the first receive port 28, the first RAT circuitry 46 configured as above can also suppress leakage of the second transmit signal 38 at the first receive port 28.

The second transmit hybrid splitter 58 is configured to generate the second in-phase transmit signal 60I at the second frequency $f_2$ and in a 0° phase. Accordingly, the second in-phase transmit signal 60I can be expressed as $f_2+0°$. The second transmit hybrid splitter 58 is configured to generate the second quadrature transmit signal 60Q at the second frequency $f_2$ and in a −90° phase (the second phase offset). Accordingly, the second quadrature transmit signal 60Q can be expressed as $f_2-90°$. The second RAT circuitry 48 includes a second quadrature amplifier circuit 94. The second quadrature amplifier circuit 94 is configured to amplify the second in-phase transmit signal 60I and the second quadrature transmit signal 60Q based on a second supply voltage $V_{CCB}$. In a non-limiting example, the second supply voltage $V_{CCB}$ can be ET modulated or APT modulated.

The second hybrid splitter/combiner 64 is configured to generate the second in-phase reflection signal 68I at the first frequency $f_1$ and in a 0° phase. Accordingly, the second in-phase reflection signal 68I can be expressed as $f_1+0°$. The second hybrid splitter/combiner 64 is configured to generate the second quadrature reflection signal 68Q at the first frequency $f_1$ and in a −90° phase. Accordingly, the second quadrature reflection signal 68Q can be expressed as $f_1-90°$.

The second RAT circuitry 48 includes second filter circuitry 96, which is provided between the second quadrature amplifier circuit 94 and the second hybrid splitter/combiner 64. In one non-limiting example, the second filter circuitry 96 can be integrated with the second hybrid splitter/combiner 64 in an acoustic die. In another non-limiting example, the second filter circuitry 96, the second hybrid splitter/combiner 64, and the second receive hybrid combiner 76 can be integrated into an acoustic die. The second filter circuitry 96 includes a second in-phase transmit filter 98 configured to pass through the second in-phase transmit signal 60I. The second filter circuitry 96 also includes a second in-phase receive filter 100 configured to pass through the second in-phase reflection signal 68I and the second in-phase receive signal 72I. The second filter circuitry 96 also includes a second quadrature transmit filter 102 configured to pass through the second quadrature transmit signal 60Q. The second filter circuitry 96 also includes a second quadrature receive filter 104 configured to pass through the second quadrature reflection signal 68Q and the second quadrature receive signal 72Q. In a non-limiting example, the second in-phase transmit filter 98, the second in-phase receive filter 100, the second quadrature transmit filter 102, and the second quadrature receive filter 104 can be implemented as SAW filters.

The second in-phase receive signal 72I is provided to the second receive hybrid combiner 76 from the second in-phase receive filter 100. The first quadrature transmit signal 60Q, which passes through the second quadrature transmit filter 102, and the second in-phase reflection signal 68I, which passes through the second in-phase receive filter 100, thus create a second receive in-phase IMD3 (denoted as IMD3-RI2 in FIG. 3A) in the second in-phase receive signal 72I. The second receive in-phase IMD3 can thus be expressed as $2*(f_1+0°)-(f_2-90°)=2f_1-f_2+2*0°+90°$. In this regard, the second receive in-phase IMD3 is located at frequency $2f_1-f_2$ and in a 90° phase.

The second quadrature receive signal 72Q is provided to the second receive hybrid combiner 76 from the second quadrature receive filter 104. The second in-phase transmit signal 60I, which passes through the second in-phase transmit filter 98, and the second quadrature reflection signal 68Q, which passes through the second quadrature receive filter 104, thus create a second receive quadrature IMD3 (denoted as IMD3-RQ2 in FIG. 3A) in the second quadrature receive signal 72Q. The second receive quadrature IMD3 can thus be expressed as $2*(f_1-90°)-(f_2+0°)=2f_1-f_2-180°$. In this regard, the second receive quadrature IMD3 is located at frequency $2f_1-f_2$ and in a −180° phase.

The second receive hybrid combiner 76 is configured to phase shift the second in-phase receive signal 72I by −90° prior to combining the second in-phase receive signal 72I with the second quadrature receive signal 72Q. As such, the second receive quadrature IMD3 becomes $2f_1-f_2-180°-90°+90°=2f_1-f_2-180°$. The −180° phase offset causes the second receive in-phase IMD and the second receive quadrature IMD to cancel each other at the second receive port 30.

In a non-limiting example, the second RAT circuitry 48 configured as above can suppress the lower IMD3 to below −110 dBm at the second receive port 30. Further, in addition to suppressing the lower IMD3 at the second receive port 30, the second RAT circuitry 48 configured as above can also suppress leakage of the first transmit signal 36 at the second receive port 30.

The second in-phase transmit signal 60I, which passes through the second in-phase transmit filter 98, and the second quadrature reflection signal 68Q, which passes through the second quadrature receive filter 104, can create a second transmit in-phase IMD3 (denoted as IMD3-TI2 in FIG. 3A) at the second antenna port 34. The second transmit in-phase IMD3 can be expressed as $2*(f_1-90°)-(f_2+0°)-90°=2f_1-f_2-270°-0°$. In this regard, the second transit in-phase IMD3 is located at a frequency $2f_1-f_2$ and in a −270° phase.

The second quadrature transmit signal 60Q, which passes through the second quadrature transmit filter 102, and the second in-phase reflection signal 68I, which passes through the second in-phase receive filter 100, can create a second transmit quadrature IMD3 (denoted as IMD3-TQ2 in FIG. 3A) at the second antenna port 34. The second transmit quadrature IMD3 can be expressed as $2*(f_1+0°)-(f_2-90°)=2f_1-f_2+90°$. In this regard, the second transmit quadrature IMD3 is located at a frequency $2f_1-f_2$ and in a +90° phase. Thus, the second transmit in-phase IMD3 and the second transmit quadrature IMD3 have a −180° phase offset between them. As a result, the second transmit in-phase IMD and the second transmit quadrature IMD cancel each other at the second antenna port 34.

Figure 3B:
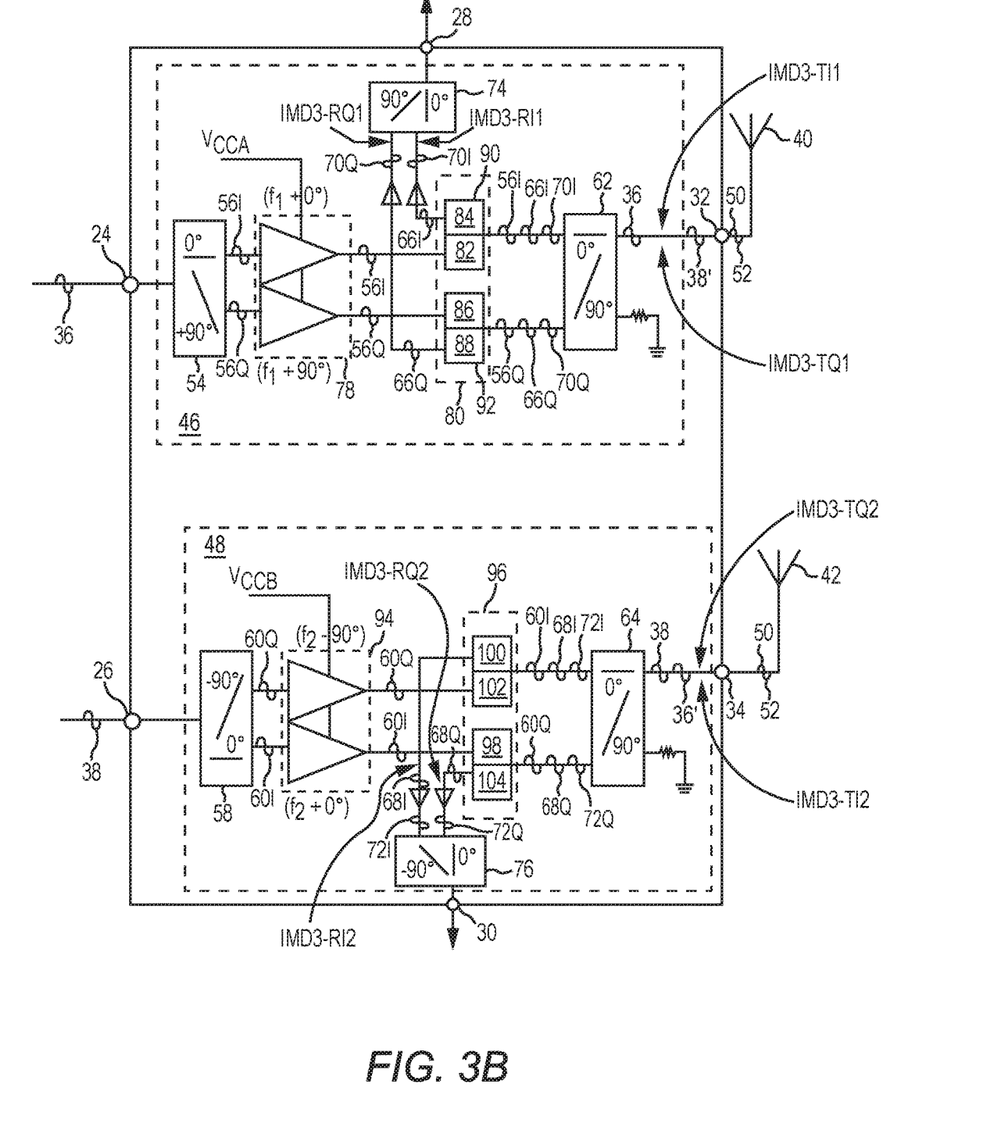
FIG. 3B is a schematic diagram providing an exemplary illustration of the multi RAT radio circuit of FIG. 2 configured to suppress an upper IMD3 according to another embodiment of the present disclosure.

FIG. 3B is a schematic diagram providing an exemplary illustration of the multi RAT radio circuit 22 of FIG. 2 configured to suppress an upper IMD3 located at frequency $2f_2-f_1$, which is higher than a first frequency $f_1$ of the first transmit band and a second frequency $f_2$ of the second transmit band. Common elements between FIGS. 2, 3A and 3B are shown therein with common element numbers and will not be re-described herein.

The first transmit hybrid splitter 54 is configured to generate the first in-phase transmit signal 56I at the first frequency $f_1$ and in a 0° phase. Accordingly, the first in-phase transmit signal 56I can be expressed as $f_1+0°$. The first transmit hybrid splitter 54 is configured to generate the first quadrature transmit signal 56Q at the first frequency $f_1$ and in a +90° phase (the first phase offset). Accordingly, the first quadrature transmit signal 56Q can be expressed as $f_1+90°$. The first quadrature amplifier circuit 78 is configured to amplify the first in-phase transmit signal 56I and the first quadrature transmit signal 56Q based on the first supply voltage $V_{CCA}$.

The first hybrid splitter/combiner 62 is configured to generate the first in-phase reflection signal 66I at the second frequency $f_2$ and in a 0° phase. Accordingly, the first in-phase reflection signal 66I can be expressed as $f_2+0°$. The first hybrid splitter/combiner 62 is configured to generate the first quadrature reflection signal 66Q at the second frequency $f_2$ and in a +90° phase. Accordingly, the first quadrature reflection signal 66Q can be expressed as $f_2+90°$.

The first in-phase transmit filter 82 is configured to pass through the first in-phase transmit signal 56I. The first in-phase receive filter 84 is configured to pass through the first in-phase reflection signal 66I and the first in-phase receive signal 70I. The first quadrature transmit filter 86 is configured to pass through the first quadrature transmit signal 56Q. The first quadrature receive filter 88 is configured to pass through the first quadrature reflection signal 66Q and the first quadrature receive signal 70Q.

The first in-phase receive signal 70I is provided to the first receive hybrid combiner 74 from the first in-phase receive filter 84 in the first in-phase duplexer 90. The first in-phase transmit signal 56I and the first in-phase reflection signal 66I, which also pass through the first in-phase duplexer 90, thus create a first receive in-phase IMD3 (denoted as IMD3-RI1 in FIG. 3B) in the first in-phase receive signal 70I. The first receive in-phase IMD3 can thus be expressed as $2*(f_2+0°)-(f_1+0°)=2f_2-f_1+2*0°-0°$. In this regard, the first receive in-phase IMD3 is located at frequency $2f_2-f_1$ and in a 0° phase.

The first quadrature receive signal 70Q is provided to the first receive hybrid combiner 74 from the first quadrature receive filter 88 in the first quadrature duplexer 92. The first quadrature transmit signal 56Q and the first quadrature reflection signal 66Q, which also pass through the first quadrature duplexer 92, thus create a first receive quadrature IMD3 (denoted as IMD3-RQ1 in FIG. 3B) in the first quadrature receive signal 70Q. The first receive quadrature IMD3 can thus be expressed as $2*(f_2+90°)-(f_1+90°)=2f_2-f_1+90°$. In this regard, the first receive quadrature IMD3 is located at frequency $2f_2-f_1$ and in a +90° phase.

The first receive hybrid combiner 74 is configured to phase shift the first quadrature receive signal 70Q by +90° prior to combining the first quadrature receive signal 70Q with the first in-phase receive signal 70I. As such, the first receive quadrature IMD3 becomes $2f_2-f_1+90°+90°=2f_2-f_1+180°$. The +180° phase offset causes the first receive in-phase IMD and the first receive quadrature IMD to cancel each other at the first receive port 28.

The first in-phase transmit signal 56I, which passes through the first in-phase transmit filter 82, and the first in-phase reflection signal 66I, which passes through the first in-phase receive filter 84, can create a first transmit in-phase IMD3 (denoted as IMD3-TI1 in FIG. 3B) at the first antenna port 32. The first transmit in-phase IMD3 can be expressed as $2*(f_2+0°)-(f_1+0°)=2f_2-f_1+2*0°-0°$. In this regard, the first transit in-phase IMD3 is located at frequency $2f_2-f_1$ and in a 0° phase.

The first quadrature transmit signal 56Q, which passes through the first quadrature transmit filter 86, and the first quadrature reflection signal 66Q, which passes through the first quadrature receive filter 88, can create a first transmit quadrature IMD3 (denoted as IMD3-TQ1 in FIG. 3B) at the first antenna port 32. The first transmit quadrature IMD3 can be expressed as $2*(f_2+90°)-(f_1+)\ 90°+90°=2f_2-f_1+180°-90°+90°=2f_2-f_1+180°$. In this regard, the first transmit quadrature IMD3 is located at frequency $2f_2-f_1$ and in a +180° phase. As a result of the +180° phase offset between the first transmit in-phase IMD and the first transmit quadrature IMD, the first transmit in-phase IMD and the first transmit quadrature IMD cancel each other at the first antenna port 32.

The second transmit hybrid splitter 58 is configured to generate the second in-phase transmit signal 60I at the second frequency $f_2$ and in a 0° phase. Accordingly, the second in-phase transmit signal 60I can be expressed as $f_2+0°$. The second transmit hybrid splitter 58 is configured to generate the second quadrature transmit signal 60Q at the second frequency $f_2$ and in a −90° phase (the second phase offset). Accordingly, the second quadrature transmit signal 60Q can be expressed as $f_2-90°$. The second quadrature amplifier circuit 94 is configured to amplify the second in-phase transmit signal 60I and the second quadrature transmit signal 60Q based on the second supply voltage $V_{CCB}$.

The second hybrid splitter/combiner 64 is configured to generate the second in-phase reflection signal 68I at the first frequency $f_1$ and in a 0° phase. Accordingly, the second in-phase reflection signal 68I can be expressed as $f_1+0°$. The second hybrid splitter/combiner 64 is configured to generate the second quadrature reflection signal 68Q at the first frequency $f_1$ and in a −90° phase. Accordingly, the second quadrature reflection signal 68Q can be expressed as $f_1-90°$.

The second in-phase transmit filter 98 is configured to pass through the second in-phase transmit signal 60I. The second in-phase receive filter 100 is configured to pass through the second in-phase reflection signal 68I and the second in-phase receive signal 72I. The second quadrature transmit filter 102 is configured to pass through the second quadrature transmit signal 60Q. The second quadrature receive filter 104 is configured to pass through the second quadrature reflection signal 68Q and the second quadrature receive signal 72Q.

The second in-phase receive signal 72I is provided to the second receive hybrid combiner 76 from the second in-phase receive filter 100. The first quadrature transmit signal 60Q, which passes through the second quadrature transmit filter 102, and the second in-phase reflection signal 68I, which passes through the second in-phase receive filter 100, thus create a second receive in-phase IMD3 (denoted as IMD3-RI2 in FIG. 3B) in the second in-phase receive signal 72I. The second receive in-phase IMD3 can thus be expressed as $2*(f_2-)\ 90°-(f_1+0°)=2f_2-f_1-180°+0°$. In this regard, the second receive in-phase IMD3 is located at frequency $2f_2-f_1$ and in a −180° phase.

The second quadrature receive signal 72Q is provided to the second receive hybrid combiner 76 from the second quadrature receive filter 104. The second in-phase transmit signal 60I, which passes through the second in-phase transmit filter 98, and the second quadrature reflection signal 68Q, which passes through the second quadrature receive filter 104, thus create a second receive quadrature IMD3 (denoted as IMD3-RQ2 in FIG. 3B) in the second quadrature receive signal 72Q. The second receive quadrature IMD3 can thus be expressed as $2*(f_2+0°)-(f_1-90°)=2f_2-f_1+90°$. In this regard, the second receive quadrature IMD3 is located at frequency $2f_2-f_1$ and in a +90° phase.

The second receive hybrid combiner 76 is configured to phase shift the second in-phase receive signal 72I by −90° prior to combining the second in-phase receive signal 72I with the second quadrature receive signal 72Q. As such, the second receive quadrature IMD3 becomes $2f_2-f_1-180°+90°-90°=2f_2-f_1-180°$. The −180° phase offset causes the second receive in-phase IMD and the second receive quadrature IMD to cancel each other at the second receive port 30.

The second in-phase transmit signal 60I, which passes through the second in-phase transmit filter 98, and the second quadrature reflection signal 68Q, which passes through the second quadrature receive filter 104, can create a second transmit in-phase IMD3 (denoted as IMD3-TI2 in FIG. 3B) at the second antenna port 34. The second transmit in-phase IMD3 can be expressed as $2*(f_2+0°)-(f_1-90°)-90°=2f_2-f_1+90°-90°$. In this regard, the second transit in-phase IMD3 is located at frequency $2f_2-f_1$ and in a 0° phase.

The second quadrature transmit signal 60Q, which passes through the second quadrature transmit filter 102, and the second in-phase reflection signal 68I, which passes through the second in-phase receive filter 100, can create a second transmit quadrature IMD3 (denoted as IMD3-TQ2 in FIG. 3B) at the second antenna port 34. The second transmit quadrature IMD3 can be expressed as $2*(f_2-90°)-(f_1+0°)=2f_2-f_1-180°$. In this regard, the second transmit quadrature IMD3 is located at frequency $2f_2-f_1$ and in a −180° phase. Thus, the second transmit in-phase IMD3 and the second transmit quadrature IMD3 have a −180° phase offset between them. As a result, the second transmit in-phase IMD and the second transmit quadrature IMD cancel each other at the second antenna port 34.

Figure 4:
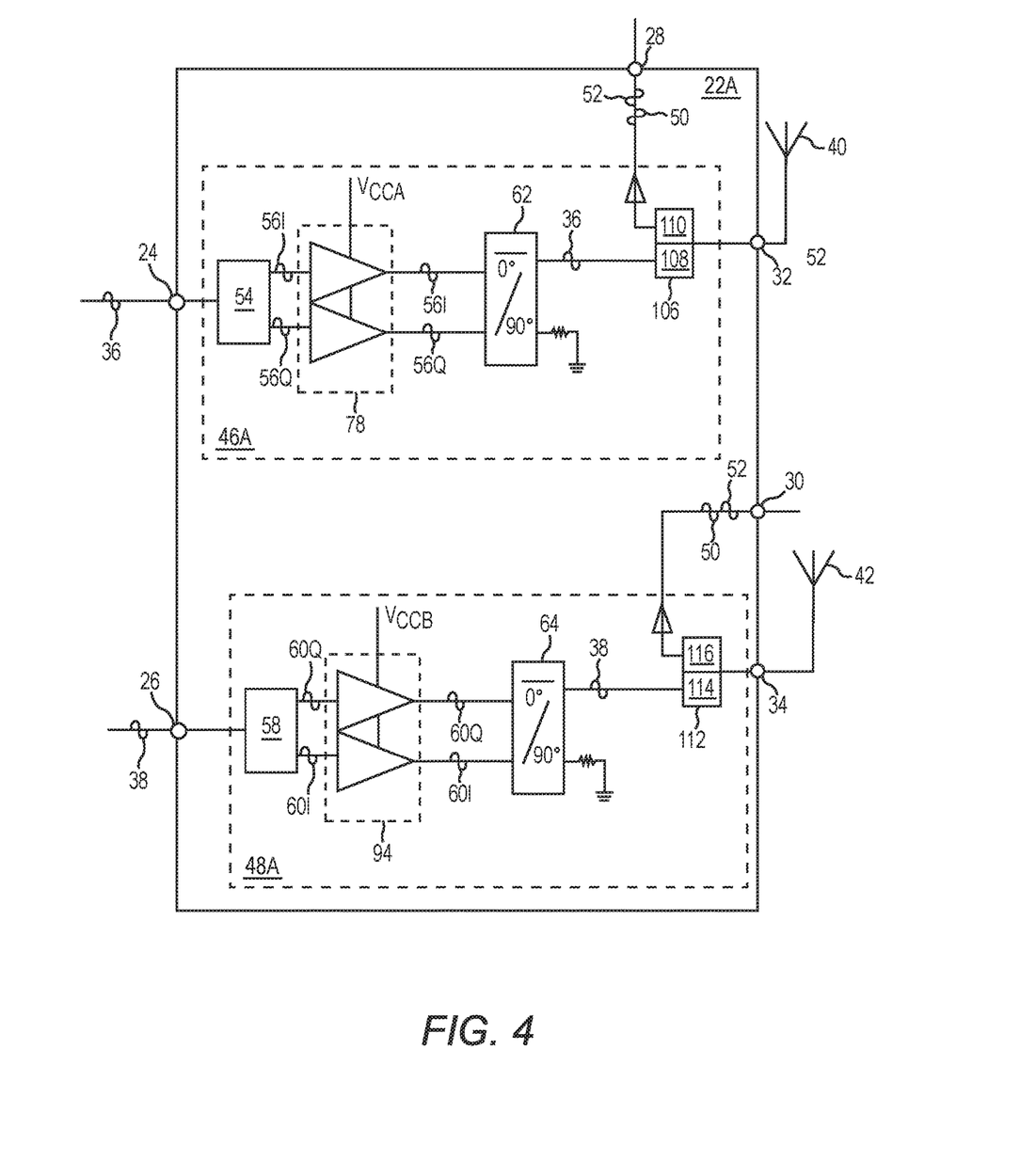
FIG. 4 is a schematic diagram of an exemplary multi RAT radio circuit configured according to an alternative embodiment of the present disclosure.

FIG. 4 is a schematic diagram of an exemplary multi RAT radio circuit 22A configured according to an alternative embodiment of the present disclosure. Common elements between FIGS. 3A, 3B, and 4 are shown therein with common element numbers and will not be re-described herein.

The multi RAT radio circuit 22A includes first RAT circuitry 46A and second RAT circuitry 48A. The first RAT circuitry 46A includes the first transmit hybrid splitter 54, the first quadrature amplifier circuit 78 coupled to the first transmit hybrid splitter 54, and the first hybrid splitter/combiner 62 coupled to the first quadrature amplifier circuit 78.

In contrast to the first RAT circuitry 46 in FIGS. 3A and 3B, the first RAT circuitry 46A includes first filter circuitry 106 provided between the first hybrid splitter/combiner 62 and the first antenna port 32. The first filter circuitry 106 includes a first transmit filter 108 and a first receive filter 110. The first transmit filter 108 is configured to receive the first transmit signal 36 from the first hybrid splitter/combiner 62 and pass through the first transmit signal 36 to the first antenna port 32. The first receive filter 110 is configured to receive concurrently the first receive signal 50 and the second receive signal 52 from the first antenna port 32, and pass through the first receive signal 50 and the second receive signal 52 to the first receive port 28.

In contrast to the second RAT circuitry 48 in FIGS. 3A and 3B, the second RAT circuitry 48A includes second filter circuitry 112 provided between the second hybrid splitter/combiner 64 and the second antenna port 34. The second filter circuitry 112 includes a second transmit filter 114 and a second receive filter 116. The second transmit filter 114 is configured to receive the second transmit signal 38 from the second hybrid splitter/combiner 64 and pass through the second transmit signal 38 to the second antenna port 34. The second receive filter 116 is configured to receive concurrently the first receive signal 50 and the second receive signal 52 from the second antenna port 34, and pass through the first receive signal 50 and the second receive signal 52 to the second receive port 30.

In a non-limiting example, the first RAT and the second RAT can be long-term evolution (LTE) and fifth-generation new radio (5G-NR), respectively. In this regard, the multi RAT radio circuit 22 of FIGS. 2, 3A, and 3B can be configured to support a variety of combinations of LTE band and 5G-NR band.

In one example, the first transmit signal 36 and the second transmit signal 38 can be modulated for transmission and/or reception in LTE band 71 (B71) and 5G-NR band 71 (N71), respectively. In another example, the first transmit signal 36 and the second transmit signal 38 can be modulated for transmission and/or reception in LTE band 41 (B41) and 5G-NR band 41 (N41), respectively. In another example, the first transmit signal 36 and the second transmit signal 38 can be modulated for transmission and/or reception in LTE band 42 (B42) and 5G-NR band 78 (N78), respectively. In another example, the first transmit signal 36 and the second transmit signal 38 can be modulated for transmission and/or reception in LTE band 42 (B42) and 5G-NR band 77 (N77), respectively. In another example, the first transmit signal 36 and the second transmit signal 38 can be modulated for transmission and/or reception in LTE band 3 (B3) and 5G-NR band 80 (N80), respectively. In another example, the first transmit signal 36 and the second transmit signal 38 can be modulated for transmission and/or reception in LTE band 8 (B8) and 5G-NR band 81 (N81), respectively. In another example, the first transmit signal 36 and the second transmit signal 38 can be modulated for transmission and/or reception in LTE band 20 (B20) and 5G-NR band 82 (N82), respectively. In another example, the first transmit signal 36 and the second transmit signal 38 can be modulated for transmission and/or reception in LTE band 28 (B28) and 5G-NR band 83 (N83), respectively. In another example, the first transmit signal 36 and the second transmit signal 38 can be modulated for transmission and/or reception in LTE band 1 (B1) and 5G-NR band 84 (N84), respectively. In yet another example, the first transmit signal 36 and the second transmit signal 38 can be modulated for transmission and/or reception in LTE band 41 (B41) and 5G-NR band 85 (N85), respectively.

Table 1 below provides a list of RF spectrums of the LTE bands that may be supported by the multi RAT radio circuit 22 of FIGS. 2, 3A, and 3B.

TABLE 1

| LTE Band | LTE Uplink Spectrum | LTE Downlink Spectrum |
|---|---|---|
| B1 | 1920-1980 MHz | 2110-2170 MHz |
| B3 | 1710-1785 MHz | 1805-1880 MHz |
| B8 | 880-915 MHz | 925-960 MHz |
| B20 | 832-862 MHz | 791-821 MHz |
| B28 | 703-748 MHz | 758-803 MHz |
| B41 | 2496-2690 MHz | |
| B42 | 3400-3600 MHz | |
| B71 | 663-698 MHz | 617-652 MHz |

Table 2 below provides a list of RF spectrums of the 5G-NR bands that may be supported by the multi RAT radio circuit 22 of FIGS. 2, 3A, and 3B.

TABLE 2

| 5G-NR Band # | 5G-NR Uplink Spectrum | 5G-NR Downlink Spectrum |
|---|---|---|
| N41 | 2496-2690 MHz | |
| N71 | 663-698 MHz | 617-652 MHz |
| N77 | 3300-4200 MHz | |
| N78 | 3300-3800 MHz | |
| N80 | 1710-1785 MHz | N/A |
| N81 | 880-915 MHz | N/A |
| N82 | 832-862 MHz | N/A |
| N83 | 703-748 MHz | N/A |
| N84 | 1920-1980 MHz | N/A |
| N85 | 2496-2690 MHz | N/A |

Those skilled in the art will recognize improvements and modifications to the embodiments of the present disclosure. All such improvements and modifications are considered within the scope of the concepts disclosed herein and the claims that follow.

What is claimed is:

1. A multi radio access technology (RAT) radio circuit comprising:
a first transmit port and a second transmit port configured to receive a first transmit signal modulated based on a first RAT for transmission in a first transmit band and a second transmit signal modulated based on a second RAT for transmission in a second transmit band, respectively;
a first receive port and a second receive port each configured to output a first receive signal modulated based on the first RAT and a second receive signal modulated based on the second RAT, respectively;
first RAT circuitry configured to split the first transmit signal into a first in-phase transmit signal and a first quadrature transmit signal having a first phase offset relative to the first in-phase transmit signal; and
second RAT circuitry configured to split the second transmit signal into a second in-phase transmit signal and a second quadrature transmit signal having a second phase offset relative to the second in-phase transmit signal;
wherein the first phase offset and the second phase offset are determined such that the first RAT circuitry and the second RAT circuitry can suppress at least one predetermined intermodulation distortion (IMD) at the first receive port and the second receive port based on the first in-phase transmit signal, the first quadrature transmit signal, the second in-phase transmit signal, and the second quadrature transmit signal.

2. The multi RAT radio circuit of claim 1 further comprising:
a first antenna port configured to output the first transmit signal and receive the first receive signal; and
a second antenna port configured to output the second transmit signal and receive the second receive signal;
wherein the first phase offset and the second phase offset are determined such that the first RAT circuitry and the second RAT circuitry can suppress the at least one predetermined IMD at the first antenna port and the second antenna port based on the first in-phase transmit signal, the first quadrature transmit signal, the second in-phase transmit signal, and the second quadrature transmit signal.

3. The multi RAT radio circuit of claim 2 wherein:
the at least one predetermined IMD is a third order IMD (IMD3) located in a radio frequency (RF) spectrum lower than respective RF spectrums of the first transmit band and the second transmit band; and
the first phase offset and the second phase offset are each determined to be negative ninety degrees to suppress the IMD3 at the first receive port, the second receive port, the first antenna port, and the second antenna port.

4. The multi RAT radio circuit of claim 2 wherein:
the at least one predetermined IMD is a third order IMD (IMD3) located in a radio frequency (RF) spectrum higher than respective RF spectrums of the first transmit band and the second transmit band; and
the first phase offset and the second phase offset are determined to be positive ninety degrees and negative ninety degrees, respectively, to suppress the IMD3 at the first receive port, the second receive port, the first antenna port, and the second antenna port.

5. The multi RAT radio circuit of claim 2 wherein the first RAT circuitry is further configured to:
receive the first transmit signal from the first transmit port and split the first transmit signal into the first in-phase transmit signal and the first quadrature transmit signal;
receive a reflection of the second transmit signal from the first antenna port and generate a first in-phase reflection signal and a first quadrature reflection signal based on the reflection of the second transmit signal;

receive the first receive signal and the second receive signal concurrently from the first antenna port; and generate the first in-phase receive signal and the first quadrature receive signal each comprising the first receive signal and the second receive signal.

6. The multi RAT radio circuit of claim 5 wherein:

the first in-phase receive signal comprises a first in-phase IMD generated by the first in-phase transmit signal and the first in-phase reflection signal;

the first quadrature receive signal comprises a first quadrature IMD generated by the first quadrature transmit signal and the first quadrature reflection signal; and the first phase offset and the second phase offset are determined such that the first in-phase IMD and the first quadrature IMD are canceled at the first receive port.

7. The multi RAT radio circuit of claim 6 wherein the first RAT circuitry comprises:

a first transmit hybrid splitter coupled to the first transmit port and configured to split the first transmit signal into the first in-phase transmit signal and the first quadrature transmit signal;

a first quadrature amplifier circuit configured to amplify the first in-phase transmit signal and the first quadrature transmit signal;

a first hybrid splitter/combiner coupled to the first antenna port and configured to:
  combine the first in-phase transmit signal and the first quadrature transmit signal into the first transmit signal such that the at least one predetermined IMD is suppressed in the first transmit signal;
  provide the first transmit signal to the first antenna port for transmission in the first transmit band;
  receive the reflection of the second transmit signal via the first antenna port;
  generate the first in-phase reflection signal and the first quadrature reflection signal based on the reflection of the second transmit signal;
  receive the first receive signal and the second receive signal concurrently via the first antenna port; and
  generate the first in-phase receive signal and the first quadrature receive signal each comprising the first receive signal and the second receive signal; and a first receive hybrid combiner coupled between the first receive port and the first hybrid splitter/combiner, the first receive hybrid combiner is configured to combine the first in-phase receive signal and the first quadrature receive signal to suppress the at least one predetermined IMD at the first receive port.

8. The multi RAT radio circuit of claim 7 wherein:

the first hybrid splitter/combiner is further configured to:
  phase shift the first quadrature transmit signal by a positive ninety degrees prior to combining the first quadrature transmit signal with the first in-phase transmit signal;
  phase shift the first quadrature reflection signal by a positive ninety degrees relative to the first in-phase reflection signal; and
  phase shift the first quadrature receive signal by a positive ninety degrees relative to the first in-phase receive signal; and the first receive hybrid combiner is further configured to phase shift the first quadrature receive signal by a positive ninety degrees.

9. The multi RAT radio circuit of claim 8 wherein the first RAT circuitry further comprises first filter circuitry provided between the first quadrature amplifier circuit and the first hybrid splitter/combiner, the first filter circuitry is configured to selectively pass through the first in-phase transmit signal, the first quadrature transmit signal, the first in-phase reflection signal, the first quadrature reflection signal, the first in-phase receive signal, and the first quadrature receive signal.

10. The multi RAT radio circuit of claim 9 wherein the first filter circuitry comprises:

a first in-phase transmit filter configured to pass through the first in-phase transmit signal;

a first in-phase receive filter configured to pass through the first in-phase reflection signal and the first in-phase receive signal;

a first quadrature transmit filter configured to pass through the first quadrature transmit signal; and a first quadrature receive filter configured to pass through the first quadrature reflection signal and the first quadrature receive signal.

11. The multi RAT radio circuit of claim 8 wherein the first RAT circuitry further comprises first filter circuitry provided between the first hybrid splitter/combiner and the first antenna port, the first filter circuitry is configured to selectively pass through the first transmit signal, the first receive signal, and the second receive signal.

12. The multi RAT radio circuit of claim 2 wherein the second RAT circuitry is further configured to:

receive the second transmit signal from the second transmit port and split the second transmit signal into the second in-phase transmit signal and the second quadrature transmit signal;

receive a reflection of the first transmit signal from the second antenna port and generate a second in-phase reflection signal and a second quadrature reflection signal based on the reflection of the first transmit signal;

receive the first receive signal and the second receive signal concurrently from the second antenna port; and generate the second in-phase receive signal and the second quadrature receive signal each comprising the first receive signal and the second receive signal.

13. The multi RAT radio circuit of claim 12 wherein:

the second in-phase receive signal comprises a second in-phase IMD generated by the second in-phase transmit signal and the second quadrature reflection signal;

the second quadrature receive signal comprises a second quadrature IMD generated by the second quadrature transmit signal and the second in-phase reflection signal; and the first phase offset and the second phase offset are determined such that the second in-phase IMD and the second quadrature IMD are canceled at the second receive port.

14. The multi RAT radio circuit of claim 13 wherein the second RAT circuitry comprises:

a second transmit hybrid splitter coupled to the second transmit port and configured to split the second transmit signal into the second in-phase transmit signal and the second quadrature transmit signal;

a second quadrature amplifier circuit configured to amplify the second in-phase transmit signal and the second quadrature transmit signal;

a second hybrid splitter/combiner coupled to the second antenna port and configured to:
  combine the second in-phase transmit signal and the second quadrature transmit signal into the second transmit signal such that the at least one predetermined IMD is suppressed in the second transmit signal;

provide the second transmit signal to the second antenna port for transmission in the second transmit band;

receive the reflection of the first transmit signal via the second antenna port;

generate the second in-phase reflection signal and the second quadrature reflection signal based on the reflection of the first transmit signal;

receive the first receive signal and the second receive signal concurrently via the second antenna port; and generate the second in-phase receive signal and the second quadrature receive signal each comprising the first receive signal and the second receive signal; and a second receive hybrid combiner coupled between the second receive port and the second hybrid splitter/combiner, the second receive hybrid combiner is configured to combine the second in-phase receive signal and the second quadrature receive signal to suppress the at least one predetermined IMD at the second receive port.

15. The multi RAT radio circuit of claim 14 wherein:
the second hybrid splitter/combiner is further configured to:
  phase shift the second quadrature transmit signal by a negative ninety degrees prior to combining the second quadrature transmit signal with the second in-phase transmit signal;
  phase shift the second quadrature reflection signal by a negative ninety degrees relative to the second in-phase reflection signal; and
  phase shift the second quadrature receive signal by a negative ninety degrees relative to the second in-phase receive signal; and
the second receive hybrid combiner is further configured to phase shift the second quadrature receive signal by a negative ninety degrees.

16. The multi RAT radio circuit of claim 15 wherein the second RAT circuitry further comprises second filter circuitry provided between the second quadrature amplifier circuit and the second hybrid splitter/combiner, the second filter circuitry is configured to selectively pass through the second in-phase transmit signal, the second quadrature transmit signal, the second in-phase reflection signal, the second quadrature reflection signal, the second in-phase receive signal, and the second quadrature receive signal.

17. The multi RAT radio circuit of claim 16 wherein the second filter circuitry comprises:
  a second in-phase transmit filter configured to pass through the second in-phase transmit signal;
  a second in-phase receive filter configured to pass through the second in-phase reflection signal and the second in-phase receive signal;
  a second quadrature transmit filter configured to pass through the second quadrature transmit signal; and
  a second quadrature receive filter configured to pass through the second quadrature reflection signal and the second quadrature receive signal.

18. The multi RAT radio circuit of claim 15 wherein the first RAT circuitry further comprises second filter circuitry provided between the second hybrid splitter/combiner and the second antenna port, the second filter circuitry is configured to selectively pass through the second transmit signal, the first receive signal, and the second receive signal.

19. The multi RAT radio circuit of claim 1 wherein the first RAT is long-term evolution (LTE) and the second RAT is fifth-generation new radio (5G-NR).

20. The multi RAT radio circuit of claim 19 wherein:
the first transmit band is LTE uplink band 71 and the second transmit band is 5G-NR uplink band 71; and
the first receive band is LTE downlink band 71 and the second transmit band is 5G-NR downlink band 71.

21. The multi RAT radio circuit of claim 19 wherein:
the first transmit band is LTE uplink band 41 and the second transmit band is 5G-NR uplink band 41; and
the first receive band is LTE downlink band 41 and the second transmit band is 5G-NR downlink band 41.

* * * * *

UNITED STATES PATENT AND TRADEMARK OFFICE
CERTIFICATE OF CORRECTION

PATENT NO. : 10,277,260 B2
APPLICATION NO. : 15/889616
DATED : April 30, 2019
INVENTOR(S) : Nadim Khlat and Andrew F. Folkmann Page 1 of 1

It is certified that error appears in the above-identified patent and that said Letters Patent is hereby corrected as shown below:

In the Specification

In Column 12, Lines 52-53, replace "$2*(f_2+90°)-(f_1+)$ $90°+90°=2f_2-f_1+180°-90°+90°=2f_2-f_1+180°$" with --$2*(f_2+90°)-(f_1+90°)+90°=2f_2-f_1+180°-90°+90°=2f_2-f_1+180°$--.

In Column 13, Line 33, replace "$2*(f_2-)$ $90°-(f_1+0°)=2f_2-f_1-180°+0°$" with --$2*(f_2-90°)-(f_1+0°)=2f_2-f_1-180°+0°$--.

In Column 14, Lines 5-6, replace "$2*(f_2-90°)-(f_1+)$ $0°=2f_2-f_1-180°$" with --$2*(f_2-90°)-(f_1+0°)=2f_2-f_1-180°$--.

Signed and Sealed this
Eleventh Day of June, 2019

Andrei Iancu
*Director of the United States Patent and Trademark Office*